United States Patent
Sugaiwa et al.

(10) Patent No.: US 9,802,623 B2
(45) Date of Patent: Oct. 31, 2017

(54) AUTONOMOUS DRIVING DEVICE

(71) Applicant: TOYOTA JIDOSHA KABUSHIKI KAISHA, Toyota-shi, Aichi (JP)

(72) Inventors: Taisuke Sugaiwa, Susono (JP); Hiromitsu Urano, Numazu (JP); Toshiki Kindo, Yokohama (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/074,135

(22) Filed: Mar. 18, 2016

(65) Prior Publication Data
US 2016/0280235 A1    Sep. 29, 2016

(30) Foreign Application Priority Data

Mar. 23, 2015 (JP) ................................. 2015-059186

(51) Int. Cl.

| | |
|---|---|
| *G05D 1/00* | (2006.01) |
| *B60W 50/10* | (2012.01) |
| *B60W 50/12* | (2012.01) |
| *B60W 50/14* | (2012.01) |
| *B60W 30/09* | (2012.01) |
| *B60W 30/095* | (2012.01) |
| *B62D 15/02* | (2006.01) |
| *B60W 50/08* | (2012.01) |
| *B60K 35/00* | (2006.01) |

(52) U.S. Cl.
CPC ........... *B60W 50/082* (2013.01); *B60K 35/00* (2013.01); *B60W 30/09* (2013.01); *B60W 50/10* (2013.01); *B60W 50/12* (2013.01); *G05D 1/0061* (2013.01); *G05D 1/0088* (2013.01); *B60W 30/095* (2013.01); *B60W 30/0956* (2013.01); *B60W 50/14* (2013.01); *B60W 2050/146* (2013.01); *B60W 2540/18* (2013.01); *B60W 2550/10* (2013.01); *B62D 15/025* (2013.01); *Y02T 10/84* (2013.01)

(58) Field of Classification Search
CPC ................. B60W 50/12; B60W 50/14; B60W 2050/146; B60W 2540/18; B60W 2550/10; G05D 1/0061; G05D 1/0088
See application file for complete search history.

(56) References Cited

U.S. PATENT DOCUMENTS

| | | | |
|---|---|---|---|
| 8,543,261 B2* | 9/2013 | Anderson | B60W 30/09 701/3 |
| 8,670,891 B1 | 3/2014 | Szybalski et al. | |
| 9,150,224 B2* | 10/2015 | Yopp | B60W 10/04 |

(Continued)

FOREIGN PATENT DOCUMENTS

DE    102013202025 A1    8/2014

*Primary Examiner* — Todd Melton
(74) *Attorney, Agent, or Firm* — Sughrue Mion, PLLC

(57) ABSTRACT

Disclosed is an autonomous driving device in which a threshold value for switching to manual driving which is used for switching a driving state from autonomous driving to manual driving with respect to degree to which a steering operation is carried out by a driver is calculated to be a greater value by a calculation unit when the direction of the steering operation is predicted to be a direction close to an obstacle than a threshold value when the direction of the steering operation is predicted to be a direction away from the obstacle or a threshold value when no obstacle is detected.

16 Claims, 11 Drawing Sheets

(56) References Cited

U.S. PATENT DOCUMENTS

| | | | |
|---|---|---|---|
| 9,428,183 B2* | 8/2016 | Foley | B60W 30/00 |
| 9,442,484 B2* | 9/2016 | Park | G05D 1/0061 |
| 9,567,006 B2* | 2/2017 | Fu | B62D 15/025 |
| 2009/0018723 A1* | 1/2009 | Chevion | B60W 50/16 |
| | | | 701/36 |
| 2010/0179715 A1 | 7/2010 | Puddy | |
| 2012/0046817 A1 | 2/2012 | Kindo et al. | |
| 2012/0283910 A1* | 11/2012 | Lee | B62D 1/286 |
| | | | 701/41 |
| 2014/0303827 A1 | 10/2014 | Dolgov et al. | |
| 2015/0346724 A1* | 12/2015 | Jones | B60W 30/12 |
| | | | 701/23 |
| 2015/0367847 A1 | 12/2015 | Haeussler et al. | |
| 2016/0103449 A1* | 4/2016 | Desnoyer | B60W 30/12 |
| | | | 701/23 |
| 2016/0252903 A1* | 9/2016 | Prokhorov | B60W 50/08 |

* cited by examiner

AUTONOMOUS DRIVING DEVICE

CROSS REFERENCE TO RELATED APPLICATIONS

The disclosure of Japanese Patent Application No. JP 2015-059186 filed on Mar. 23, 2015 is incorporated herein by reference in its entirety.

TECHNICAL FIELD

Aspects of the present disclosure relate to an autonomous driving device.

BACKGROUND

In the related art, as disclosed in U.S. Pat. No. 8,670,891, an autonomous driving device is known, in which, when autonomous driving is executed in a host vehicle and an amount of any of a steering operation, an acceleration operation or a braking operation by a driver of the host vehicle is equal to or greater than a predetermined threshold value during the autonomous driving, the driving state is switched from autonomous driving to manual driving.

SUMMARY

In an autonomous driving device described above, it is desired to improve operability when switching the driving state from autonomous driving to manual driving and reduce switching of the driving state from autonomous driving to manual driving due to an erroneous or accidental operation by the driver.

However, when a threshold value for switching the driving state from autonomous driving to manual driving based on an amount of driving operation by a driver is too large, it becomes difficult to switch the driving state from autonomous driving to manual driving with respect to an intentional driving operation by the driver, and thus, the operability deteriorates. On the other hand, when the threshold value is too small, it becomes easy to switch the driving state from autonomous driving to manual driving by an erroneous operation of the driver, and thus, the erroneous operation is too easily reflected in the behavior of the host vehicle. Therefore, an improvement in this respect is desired.

Accordingly, an object of the present disclosure is to provide an autonomous driving device in which the operability when switching the driving state from autonomous driving to manual driving is improved and switching of the driving state from autonomous driving to manual driving due to an erroneous or accidental operation by the driver is reduced.

According to an aspect of the present disclosure, there is provided an autonomous driving device configured to execute autonomous driving of a host vehicle, and switch a driving state from autonomous driving to manual driving when a value indicative of a degree to which a steering operation is carried out by a driver of the host vehicle during the autonomous driving is equal to or greater than a threshold value for switching to manual driving. The autonomous driving device includes: an acquisition unit configured to acquire the value indicative of a degree to which the steering operation is carried out during the autonomous driving; a recognition unit configured to recognize an obstacle around the host vehicle; a calculation unit configured to calculate the threshold value for switching to manual driving; and a control unit configured to execute the autonomous driving and switch the driving state from autonomous driving to manual driving when the value indicative of a degree to which the steering operation is carried out by the driver is equal to or greater than the threshold value for switching to manual driving. The calculation unit is configured to calculate the threshold value for switching to manual driving as being greater when the direction of the steering operation is predicted to be a direction close to an obstacle recognized by the recognition unit than a threshold value when the direction of the steering operation is predicted to be a direction away an obstacle or a threshold value when no obstacle is recognized by the recognition unit.

According to this configuration, the threshold value for switching to manual driving which is used for switching the driving state from autonomous driving to manual driving based on the value indicative of the degree to which the steering operation is carried out by the driver is calculated by the calculation unit to be a greater value when the direction of the steering operation is predicted to be a direction close to an obstacle recognized by the recognition unit than a threshold value when the direction of the steering operation is predicted to be a direction away from an obstacle recognized by the recognition unit or a threshold value when no obstacle is recognized by the recognition unit. For this reason, for example, when the direction of the steering operation is the direction away from the obstacle because the driver recognizes the obstacle or when there is no obstacle present, it becomes easy to switch the driving state from autonomous driving to manual driving. Therefore, the operability of switching the driving state from autonomous driving to manual driving is improved. On the other hand, for example, when the driver does not recognize the obstacle and the direction of the steering operation is predicted to be the direction close to the obstacle, it becomes difficult to switch the driving state from autonomous driving to manual driving. Therefore, it is possible to reduce switching of the driving state from autonomous driving to manual driving due to an erroneous operation.

In this case, the autonomous driving device may further include a display unit configured to display the threshold value for switching to manual driving for each direction of the steering operation and for the case when no obstacle is recognized by the recognition unit.

According to this configuration, the threshold value for switching to manual driving for each direction of the steering operation is displayed by the display unit. Therefore, it becomes easy for the driver to recognize the situation when the driving state is switched from autonomous driving to manual driving.

According to an aspect of the present disclosure, in the autonomous driving device, it is possible to improve the operability when switching the driving state from the autonomous driving to the manual driving, and reduce the switching of the driving state from autonomous driving to manual driving due to an erroneous operation.

DETAILED DESCRIPTION

Figure 1:
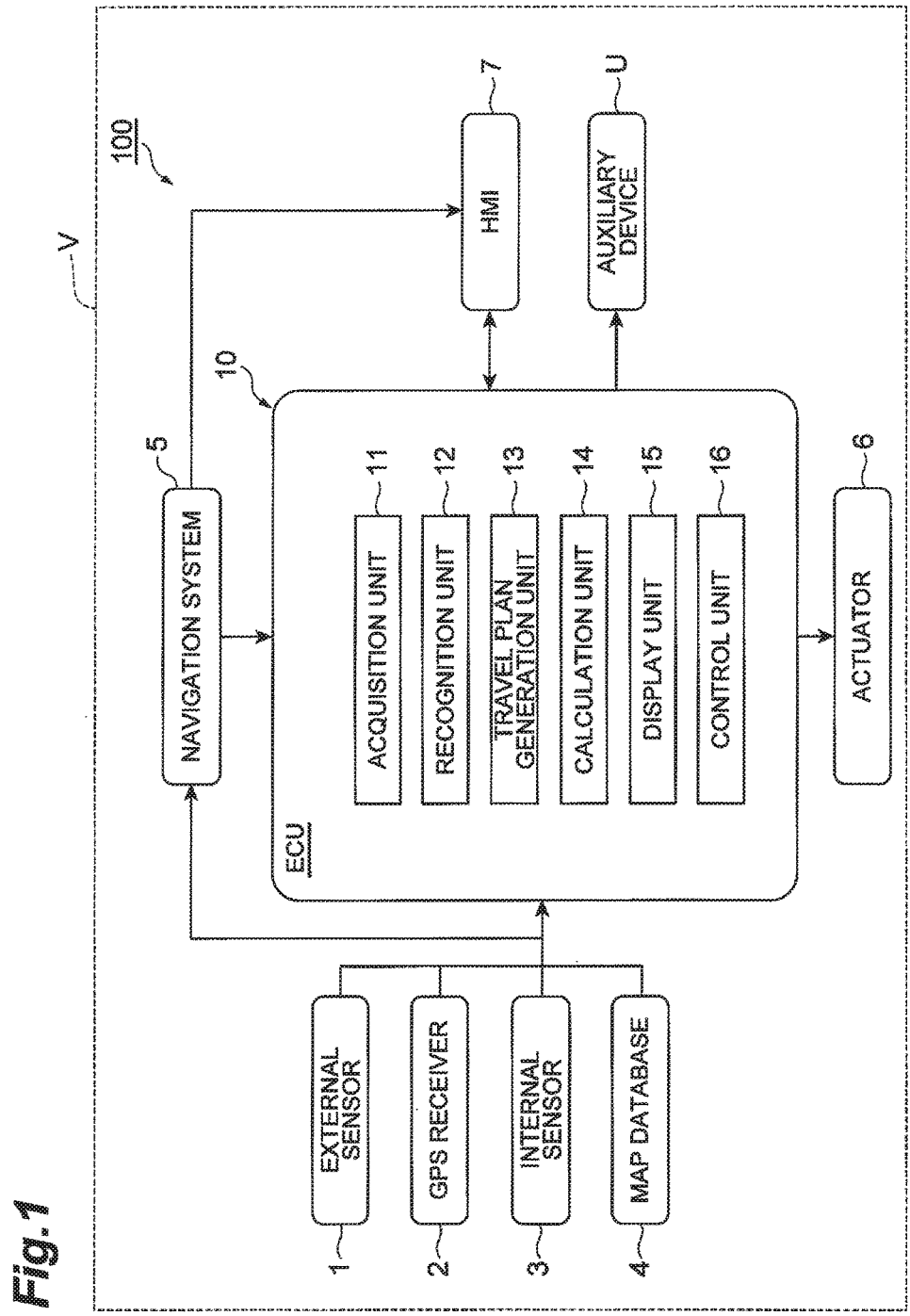
FIG. 1 is a block diagram illustrating a configuration of an autonomous driving device in a first embodiment.

Hereinafter, a first embodiment of the present disclosure will be described in detail with reference to the drawings. As illustrated in FIG. 1, an autonomous driving device 100 is mounted on a host vehicle V such as a passenger car, an electric wheelchair, a passenger car for people with disabilities, or the like. The autonomous driving device 100 executes autonomous driving of the host vehicle V. The autonomous driving means that the driving operation of the host vehicle V such as acceleration, deceleration, and steering are executed regardless of the driving operation by a driver of the host vehicle V. The autonomous driving device 100 in the first embodiment executes the autonomous driving of the host vehicle V, and when a value indicative of a degree to which a steering operation is carried out by the driver of the host vehicle V during the autonomous is equal to or greater than a threshold value for switching to manual driving, the autonomous driving device 100 switches the driving state from autonomous driving to manual driving. The threshold value for switching to manual driving is a threshold value of a value indicative of a degree to which an operation is carried out by a driver that is used for switching the driving state from autonomous driving to manual driving with respect to the degree to which the steering operation is carried out by the driver of the host vehicle V.

As illustrated in FIG. 1, the autonomous driving device 100 includes an external sensor 1, a GPS (Global Positioning System) receiver 2, an internal sensor 3 a map database 4, a navigation system 5, an actuator 6, a HMI (Human Machine Interface) 7, an auxiliary device U, and an ECU 10.

The external sensor 1 is a detection device configured to detect an external situation which is peripheral information of the host vehicle V. The external sensor 1 includes at least one of a camera, radar, and laser imaging detection and ranging (LIDAR) system.

The camera is an imaging device for imaging an external situation of the host vehicle V. The camera is, for example, provided on the inside of a windshield of the host vehicle V. The camera may be a monocular camera or may be a stereo camera. The stereo camera has, for example, two imaging units that are arranged so as to reproduce a binocular parallax. The image information of the stereo camera also includes information on the depth direction. The camera outputs the image information relating to the external situation to the ECU 10 of the vehicle V.

The radar detects an obstacle outside of the host vehicle V using a radio wave. The radio wave is, for example, a millimeter wave. The radar detects the obstacle by transmitting the radio wave to the surroundings of the host vehicle V and receiving the wave reflected from the obstacle. The radar can output, for example, the distance or direction to the obstacle as obstacle information of the obstacle. The radar outputs detected obstacle information to the ECU 10. In a case of performing sensor fusion, the received information on the reflected radio wave may be output to the ECU 10.

The LIDAR detects the obstacle outside the host vehicle V using light. The LIDAR transmits the light to the surroundings of the host vehicle V, measures the distance to the reflection point by receiving the light reflected from the obstacle, and then, detects the obstacle. The LIDAR can output, for example, the distance or direction to the obstacle as the obstacle information of the obstacle. The LIDAR outputs the detected obstacle information to the ECU 10. In a case of performing sensor fusion, the received information on the reflected light may be output to the ECU 10. The camera, the LIDAR, and the radar are not necessarily provided in an overlapping manner.

The GPS receiver 2 receives signals from three or more GPS satellites and acquires position information indicating the position of the host vehicle V. The latitude and the longitude of the host vehicle V may be included in the position information. The GPS receiver 2 outputs the measured position information of the host vehicle V to the ECU 10. Instead of the GPS receiver 2, another means for specifying the latitude and the longitude at which the host vehicle V is present may be used.

The internal sensor 3 is a detection device configured to detect information corresponding to a travelling state of the host vehicle V and the degree to which a steering operation is carried out by the driver of the host vehicle V. In order to detect the information corresponding to the travelling state of the host vehicle V, the internal sensor 3 includes at least one of a vehicle speed sensor, an acceleration sensor, and a yaw rate sensor. In addition, in order to detect the degree to which the steering operation is carried out by the driver, the internal sensor 3 includes a steering sensor.

The vehicle speed sensor is a detection device configured to detect the speed of the host vehicle V. As the vehicle speed sensor, for example, a wheel speed sensor is used, which is provided on vehicle wheels of the host vehicle V or a drive shaft and the like rotating integrally with vehicle wheels and detects a rotational speed of the vehicle wheels. The vehicle speed sensor outputs the vehicle speed information (vehicle wheel speed information) including the speed of the host vehicle V to the ECU 10.

The acceleration sensor is a detection device configured to detect an acceleration of the host vehicle V. The acceleration sensor includes, for example, a longitudinal acceleration sensor that detects acceleration in the longitudinal direction of the host vehicle V and a lateral acceleration sensor that detects a lateral acceleration of the host vehicle V. The acceleration sensor outputs acceleration information including the acceleration of the host vehicle V to the ECU 10.

The yaw rate sensor is a detection device of the host vehicle V configured to detect a yaw around the vertical axis of the center of gravity of the host vehicle V (rotational angular velocity). As the yaw rate sensor, for example, a gyro sensor can be used. The yaw rate sensor outputs yaw rate information including the yaw rate of the host vehicle V to the ECU 10.

The steering sensor is a detection device configured to detect, for example, a value indicative of the degree to which a steering operation with respect to the steering wheel is carried out by the driver. The value indicative of a degree to which a steering operation is carried out, as detected by the steering sensor is, for example, a steering angle of a steering wheel or a steering torque with respect to the steering wheel. The steering sensor is provided on, for example, the steering shaft of the host vehicle V. The steering sensor outputs information including the steering angle of the steering wheel and the steering torque with respect to the steering wheel to the ECU 10.

When the host vehicle V is an electric wheelchair, a passenger car for people with disabilities, or the like, and the steering operation by the driver of the host vehicle V is performed using a joystick, the autonomous driving device 100 may include a sensor that detects the steering angle of the joystick.

The map database 4 is a database in which map information is included. The map database 4 is formed, for example, in a hard disk drive (HDD) mounted on the host vehicle V. In the map information, for example, position information of the road, information on the road type, and position information of intersections and branch points are included. For example, type of a curve or a straight portion and a curvature of the curve are included in the information on the road type. Furthermore, when the autonomous driving device 100 uses the position information of a shielding structure such as a building or a wall and simultaneous localization and mapping technology (SLAM), the map information may include an output signal of the external sensor 1. The map database 4 may be stored in a computer in a facility such as an information processing center which is capable of communicating with host vehicle V.

The navigation system 5 is a device configured to perform guidance to a destination set on the map by a driver of the host vehicle V for a driver of the host vehicle V. The navigation system 5 calculates a travelling route of the host vehicle V based on the position information of the host vehicle V measured by the GPS receiver 2 and the map information in the map database 4. The route may be a route on which a travelling lane is specified, in which the host vehicle V travels in a multi-lane section, for example. The navigation system 5 calculates, for example, a target route from the position of the host vehicle V to the destination and performs notification to the driver by display on a display or a voice output of a speaker. The navigation system 5, for example, transmits the target route information of the host vehicle V to the ECU 10. The navigation system 5 may be stored in a computer in a facility such as an information processing center which is capable of communicating with host vehicle V. Alternatively, a part of processing performed by the navigation system 5 may be performed by the computer in the facility.

The actuator 6 is a device configured to perform a travel control on the host vehicle V. The actuator 6 includes at least a throttle actuator, a brake actuator, and a steering actuator. The throttle actuator controls a supply amount (throttle opening degree) of air to an engine according to the control signal from the ECU 10, and controls the driving force of the host vehicle V. When the host vehicle V is a hybrid vehicle or an electric vehicle, the throttle actuator is not included and the driving force is controlled by the control signal from the ECU 10 being input to a motor which is a source of the driving force.

The brake actuator controls a brake system according to the control signal from the ECU 10 and controls the braking force given to the wheels of the host vehicle V. For example, a hydraulic brake system can be used as the brake actuator. The steering actuator controls the driving of an assist motor that controls steering torque in the electric power steering system according to the control signal from the ECU 10. In this way, the steering actuator controls the steering torque of the host vehicle V.

The HMI 7 is an interface configured to perform an input and output of the information between the occupants (including the driver) of the host vehicle V and the autonomous driving device 100. The HMI 7 includes, for example, a display panel for displaying the image information for the occupant, a speaker for audio output, and an operation button or a touch panel for the occupant to perform the input operation. As described below, in the first embodiment, the HMI 7 includes an indicator for indicating the threshold value for switching to manual driving on the instrument panel or the like. The HMI 7 may perform the outputting of the information to the occupants using a wirelessly connected mobile information terminal or may receive the input operation from the occupants using the mobile information terminal.

The auxiliary device U is a device that can be generally operated by the driver of the host vehicle V. The auxiliary device U is a device collectively referring to devices not included in the actuator 6. Here, the auxiliary device U includes, for example, a turn signal or hazards lamp, a headlight, a windshield wiper, and the like.

The ECU 10 controls the autonomous driving of the host vehicle V. The ECU 10 is an electronic control unit including a central processing unit (CPU), read only memory (ROM), random access memory (RAM), and the like. The ECU 10 includes an acquisition unit 11, a recognition unit 12, a travel plan generation unit 13, a calculation unit 14, a display unit 15, and a control unit 16. In the ECU 10, the control of each unit such as the above-described acquisition unit 11 is performed by loading the program stored in the ROM into the RAM and executing the program by the CPU. The ECU 10 may be configured with a plurality of electronic control units, or may be a single electronic control unit.

The acquisition unit 11 acquires the value indicative of the degree to which the steering operation is carried out by the driver of the host vehicle during the autonomous driving based on the information acquired by the internal sensor 3. The value indicative of the degree to which the steering operation is carried out is, for example, the steering angle of the steering wheel, the steering torque with respect to the steering wheel, or the steering angle of the joystick. The acquisition unit may also be configured as an acquirer.

The recognition unit 12 recognizes the surrounding environment of the host vehicle V based on the information acquired by the external sensor 1. For example, a pedestrian, another vehicle, a moving object such as a motorcycle or a bicycle, a stationary object such as a curb, a guardrail, a pole, a median strip, a building, or a tree may be included in obstacles recognized by the obstacle recognition unit 12. The recognition unit 12 acquires information on attributes (nature of the obstacle such as hardness, shape of the obstacle), position, distance, direction, speed, and acceleration of the obstacle. The recognition unit may also be configured as a recognizer.

The travel plan generation unit 13 generates a travel plan for the host vehicle V based on the information on the target route calculated by the navigation system 5, the information of the obstacle around the host vehicle V recognized by the environment recognition unit 12, and the map information acquired by the map database 4. The travel plan is a trajectory of the host vehicle V on the target route. For example, a speed, an acceleration, a deceleration, a direction, and a steering angle of the host vehicle V may be included in the travel plan. The travel plan generation unit 13 generates a travel plan such that the host vehicle V can travel while satisfying standards such as a safety, regulatory compliance, and driving efficiency on the target route. Furthermore, the travel plan generation unit 13 generates a travel plan for the host vehicle V so as to avoid contact with an obstacle based on the situation of the obstacle around the host vehicle V.

During autonomous driving, the calculation unit 14 calculates the threshold value in terms of steering operation amount for switching to manual driving based on the steering direction of the steering operation during the autonomous driving for which a value indicative of the degree to which it is carried out is acquired by the acquisition unit 11, the information on the state of the obstacle such as the position, distance, and the speed of the obstacle acquired by the recognition unit 12, and the travelling state of the host vehicle V acquired by the internal sensor 3. As described below, the calculation unit 14 calculates a degree of danger with respect to the obstacle according to the state of the obstacle and the state of the host vehicle V, and calculates the threshold value for switching to manual driving for each direction of the steering operation based on the degree of danger. A function relating the degree of danger corresponding to the state of the obstacle and the state of the host vehicle V and a function relating the threshold value for switching to manual driving corresponding to the degree of danger are included in the ECU 10. The calculation unit may also be configured as a calculator.

The display unit 15 displays the threshold value for switching to manual driving for each direction of the steering operation on an indicator of the HMI 7. The display unit 15 and the indicator of the HMI 7 for displaying the threshold value for switching to manual driving are not necessarily required, and may be omitted from the autonomous driving device 100. The display unit may be configured as a display.

The control unit 16 automatically controls the travelling of the host vehicle V based on the travel plan generated by the travel plan generation unit 13. The control unit 16 outputs a control signal corresponding to the travel plan to the actuator 6. In this way, the control unit 16 controls the travelling of the host vehicle V such that the autonomous driving of the host vehicle V can be executed according to the travel plan. In addition, when the value acquired by the acquisition unit 11 is equal to or greater than the threshold value for switching to manual driving calculated by the calculation unit 14, the control unit 16 can switch the driving state from autonomous driving to manual driving. The control unit may be configured as a controller.

Figure 2:
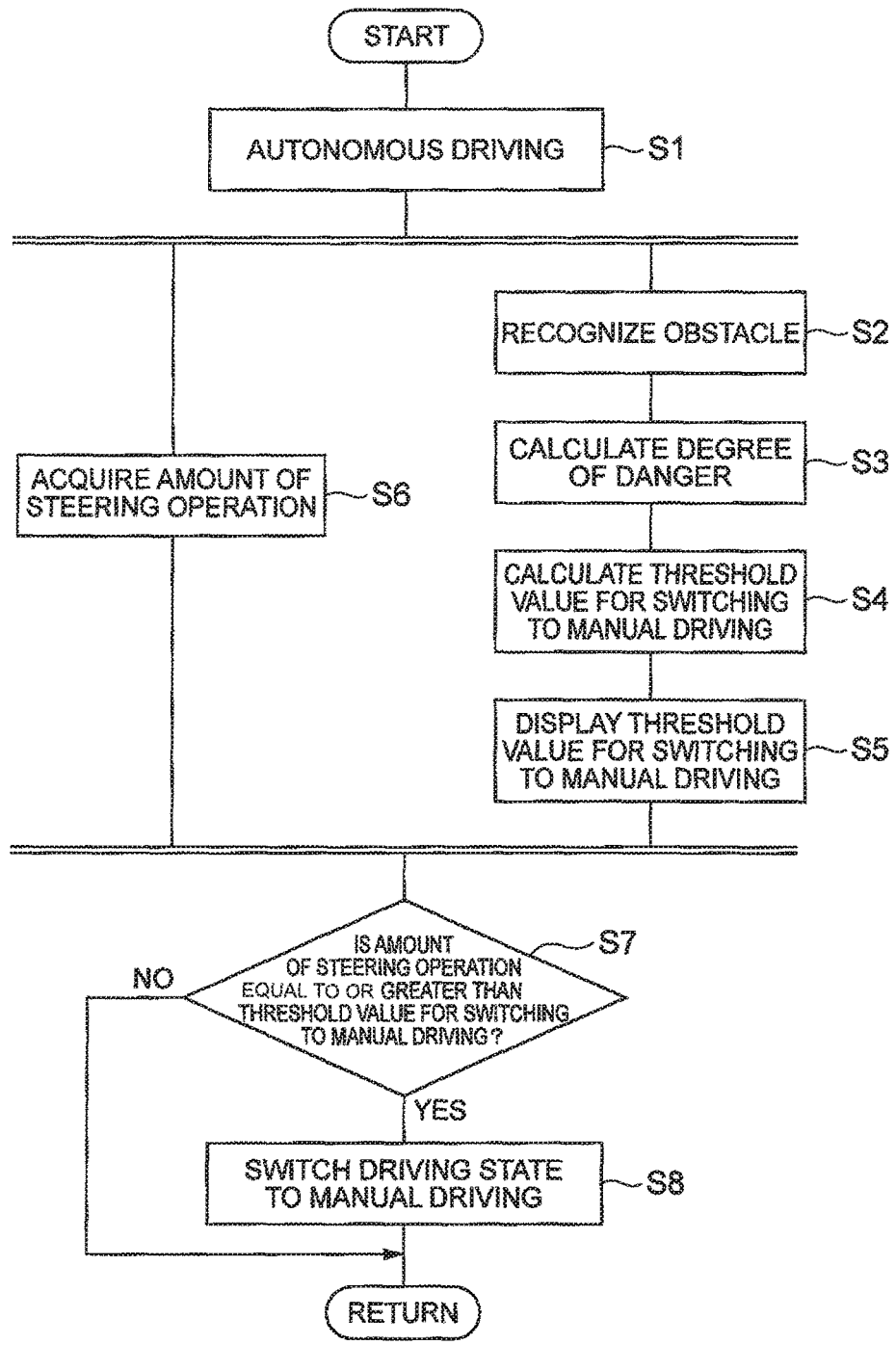
FIG. 2 is a flowchart illustrating an operation of the autonomous driving device in FIG. 1.

Next, the processing executed by the autonomous driving device 100 will be described. As illustrated in FIG. 2, the control unit 16 of the ECU 10 executes the autonomous driving of the host vehicle V based on the travel plan generated by the travel plan generation unit 13 (S1). In starting the autonomous driving, for example, when an ignition of the host vehicle V is turned ON, the control unit 16 determines whether autonomous driving can be executed or not based on the surrounding environment of the host vehicle V recognized by the external sensor 1 and the recognition unit 12 of the ECU 10. When it is determined that autonomous driving can be executed, the control unit 16 notifies the occupants though the HMI 7 of the fact that autonomous driving can be executed. By the occupant performing a predetermined input operation to the HMI 7, the autonomous driving device 100 starts autonomous driving. The recognition unit 12 of the ECU 10 recognizes an obstacle around the host vehicle V (S2). The calculation unit 14 of the ECU 10 calculates the degree of danger of the obstacle according to the state of the obstacle and the state of the host vehicle V (S3).

Figure 3:
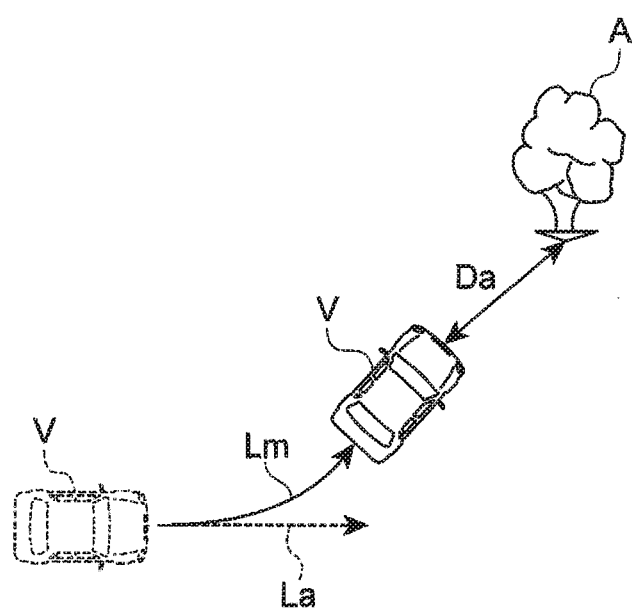
FIG. 3 is a diagram illustrating a situation of a case where there is one obstacle.

Hereinafter, the calculation of the degree of danger will be described. As illustrated in FIG. 3, it is assumed that an obstacle A exists in the vicinity of the host vehicle V. A trajectory La when the host vehicle V is assumed to travel by autonomous driving and various trajectories L(i) (i=1 to m, m is an arbitrary natural number) when the host vehicle V is assumed to travel in various directions d(i) (i=1 to m, m is an arbitrary natural number) according to the steering operation by the driver are predicted. As an example, a trajectory Lm when the direction of the host vehicle V by the steering operation by the driver is assumed to be the direction of the obstacle A is illustrated in FIG. 3. The calculation unit 14 calculates a current state value X0 such as the position, direction (steering angle), speed, and acceleration of the host vehicle V based on the information acquired by the external sensor 1, the GPS receiver 2, and the internal sensor 3. The direction of the host vehicle may be represented by, for example, a navigational heading.

As described above, in each case where the host vehicle V is assumed to travel in various directions d(i) according to the steering operation by the driver, the calculation unit 14 predicts a value for state X(i) (i=1 to m, m is an arbitrary natural number) of the host vehicle V after an arbitrary time t seconds has passed. On the other hand, the calculation unit 14 acquires a current value for state Xa0 of the obstacle A such as the attributes, position, distance, direction, speed, and acceleration of the obstacle A based on the information recognized by the recognition unit 12. The calculation unit 14 predicts the value for state Xa of the obstacle A after t seconds.

The calculation unit 14 inputs the value for state X(i) of the host vehicle V and the value for state Xa of the obstacle A into a function f set in advance, and then, calculates the degree of danger Ri=f (X(i), Xa). In the function f, when the information on the position in the value for state X(i) of the host vehicle V is set to be x(i) and the information on the position in the value for state Xa of the obstacle A is set to be xa, it is possible to set the degree of danger as R(i)=1/Da (i=1 to m, m is an arbitrary natural number) based on a fact that a distance between the host vehicle V and the obstacle A is Da=|x(i)−xa|. In this way, in the situation in which the obstacle A exists, the calculation unit 14 calculates the degree of danger R(i) at an arbitrary time t seconds later in each case where the host vehicle V is assumed to travel in various directions d(i) according to the steering operation by the driver.

Figure 4:
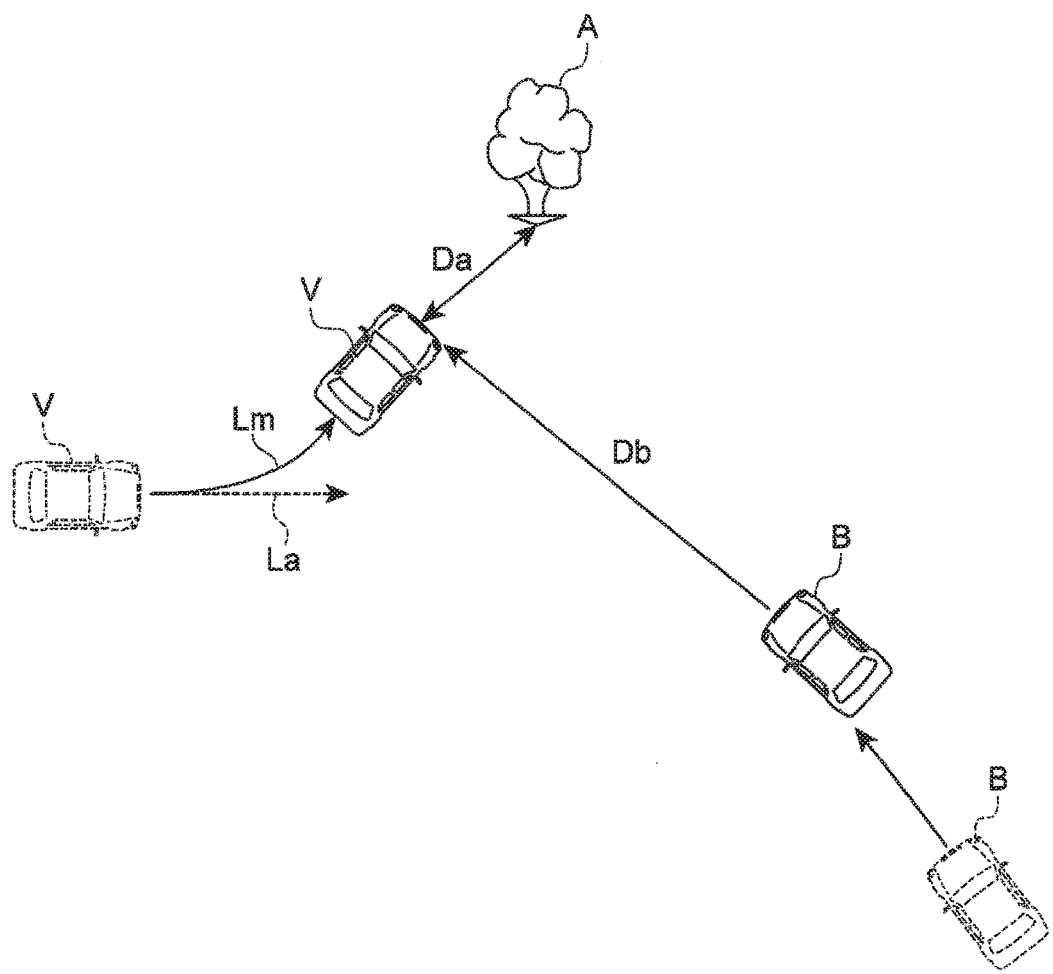
FIG. 4 is a diagram illustrating a situation of a case where there are two obstacles.

In another example, as illustrated in FIG. 4, it is assumed that an obstacle A and an obstacle B exist in the vicinity of the host vehicle V. As above, when there exist a plurality of obstacles recognized by the recognition unit 12, the calculation unit 14 executes the prediction of the value for the state of the obstacles with respect to all the obstacles described above, and calculates the degree of danger R(i) at an arbitrary time t seconds later in each case where the host vehicle V is assumed to travel in various directions according to the steering operation by the driver in the situation in which the plurality of obstacles exist. The calculation unit 14 acquires a current value for state Xb0 of the obstacle B, and predicts the value for state Xb of the obstacle B after t seconds. The calculation unit 14 inputs the value for state X(i) of the host vehicle V, the value for state Xa of the obstacle A, and the value for state Xb of the obstacle B into the function f set in advance, and calculates the degree of danger R(i)=f (X(i), Xa, Xb). In the function, for example, when the information on the position in the value for state Xb of the obstacle B is set to be xb, it is possible to set the degree of danger as R(i)=(1/Da)+(1/Db) based on a fact that a distance between the host vehicle V and the obstacle B is Db=|x(i)−xb|. Similarly, for example, in a situation in which obstacles A to K exist in the vicinity of the host vehicle V, the degree of danger can be set to R(i)=(1/Da)+ . . . +(1/Dk) (K and k are arbitrary natural numbers) based on a fact that a distance between the host vehicle V and the obstacle K is Dk=|x−xk|.

In this way, the calculation unit 14 calculates the degree of danger R(i) in each case where the host vehicle V is assumed to travel in various directions d(i) according to the steering operation by the driver. In the first embodiment, as the host vehicle V travels in the direction closer to the obstacles A and B, the result of the calculation of the degree of danger R(i) by the calculation unit 14 becomes higher. In the first embodiment, when obstacles A and B do not exist in the vicinity of the host vehicle V, the calculation unit 14 may estimate the degree of danger as R(i)=0 because the distances Da and Db are infinite.

The calculation unit 14 calculates the degree of danger R(i) based on the information on the speed, acceleration, attributes of the obstacle A and the obstacle B or the combination thereof among the value for state Xa of the obstacle A and the value for state Xb of the obstacle B.

Figure 5:
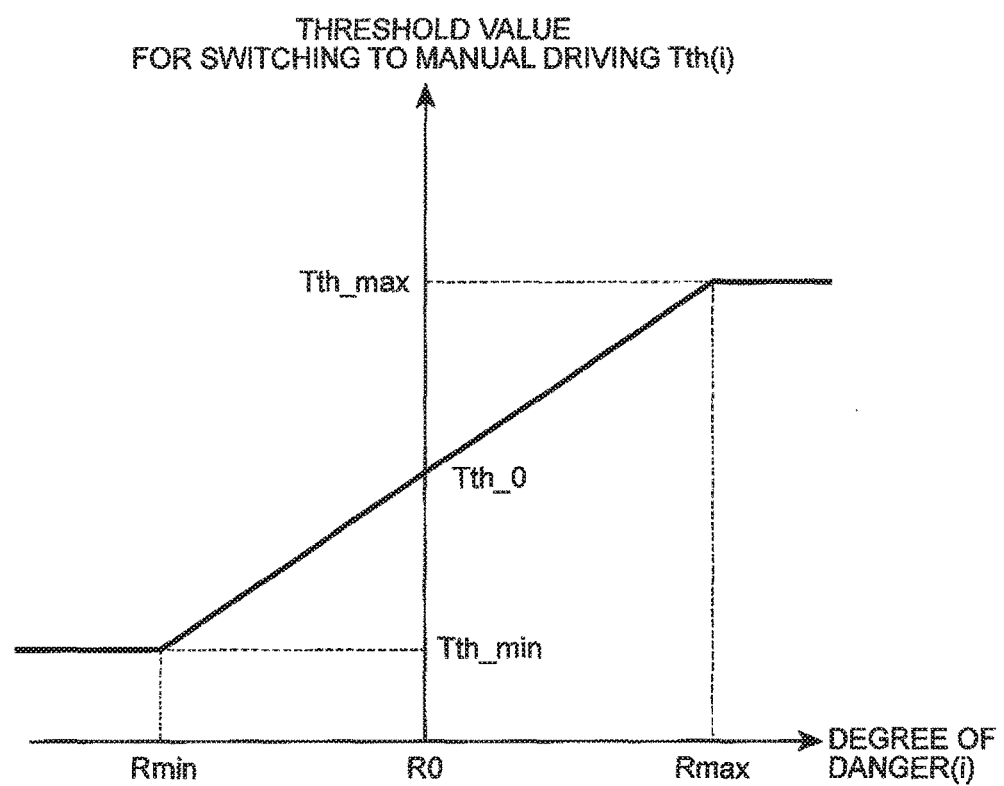
FIG. 5 is a graph illustrating a linear function of a threshold value for switching to manual driving with respect to a degree of danger.

As illustrated in FIG. 2, the calculation unit 14 calculates the threshold value for switching to manual driving based on the degree of danger R(i) in various directions according to the steering operation by the driver (S4). A function describing the threshold value Tth(i) for switching to manual driving with respect to the degree of danger R(i) illustrated in FIG. 5, for example, is stored in the ECU 10. In FIG. 5, Tth_0 is a reference value of the threshold value Tth for switching to manual driving. Tth_max is a maximum value of the threshold value Tth(i) for switching to manual driving. Tth_min is a minimum value of the threshold value Tth(i) for switching to manual driving. R0 is a reference value of the degree of danger R(i). Rmax is a maximum value of the degree of danger R(i) that changes the threshold value Tth(i) for switching to manual driving. Rmin is a minimum value of the degree of danger R(i) that changes the threshold value Tth(i) for switching to manual driving.

Figure 6:
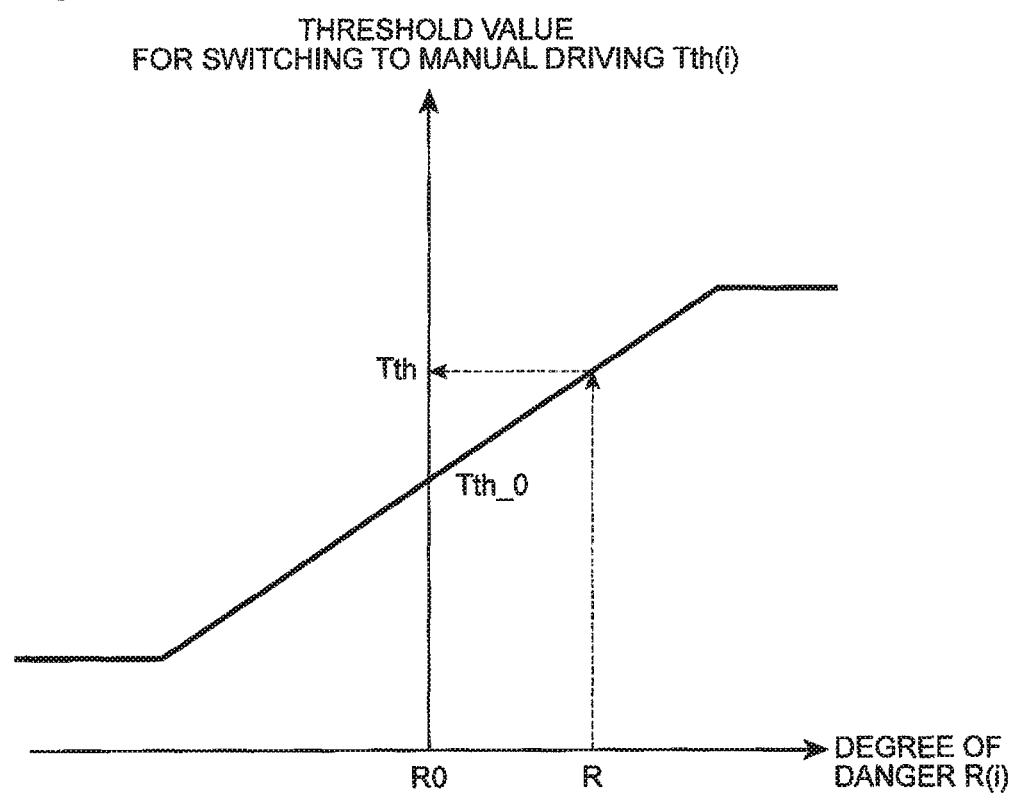
FIG. 6 is a diagram illustrating a calculation of the threshold value for switching to manual driving with respect with respect to the degree of danger using the function in FIG. 5.

In the example in FIG. 5, if the degree of danger is in the range of R(i)>Rmax, the threshold value Tth(i) for switching to manual driving becomes a saturated value as Tth(i) =Tth_max, and if the degree of danger is in the range of R(i)<Rmin, the threshold value Tth(i) for switching to manual driving becomes a saturated value as Tth(i)=Tth-_min. If the degree of danger R(i) is in the range of Rmin≤degree of danger R≤Rmax, the threshold value Tth(i) for switching to manual driving linearly increases as the degree of danger R(i) increases. For example, as illustrated in FIG. 6, the calculation unit 14 calculates the threshold value Tth(i) for switching to manual driving with respect to a certain degree of danger R(i). In addition, when the degree of danger R(i)=0 because no obstacle exists in the vicinity of the host vehicle V, the calculation unit 14 calculates the threshold value Tth(i) for switching to manual driving as Tth(i)=Tth_min.

Figure 7:
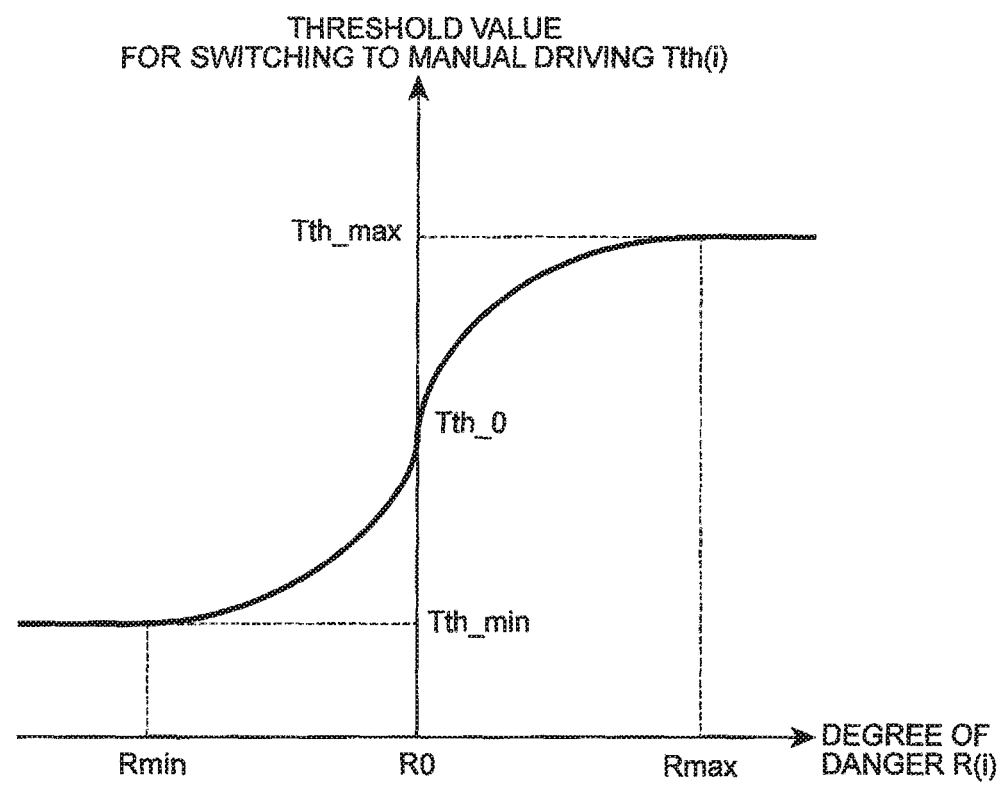
FIG. 7 is another example of a graph illustrating a function of the threshold value for switching to manual driving with respect to a degree of danger.
Figure 8:
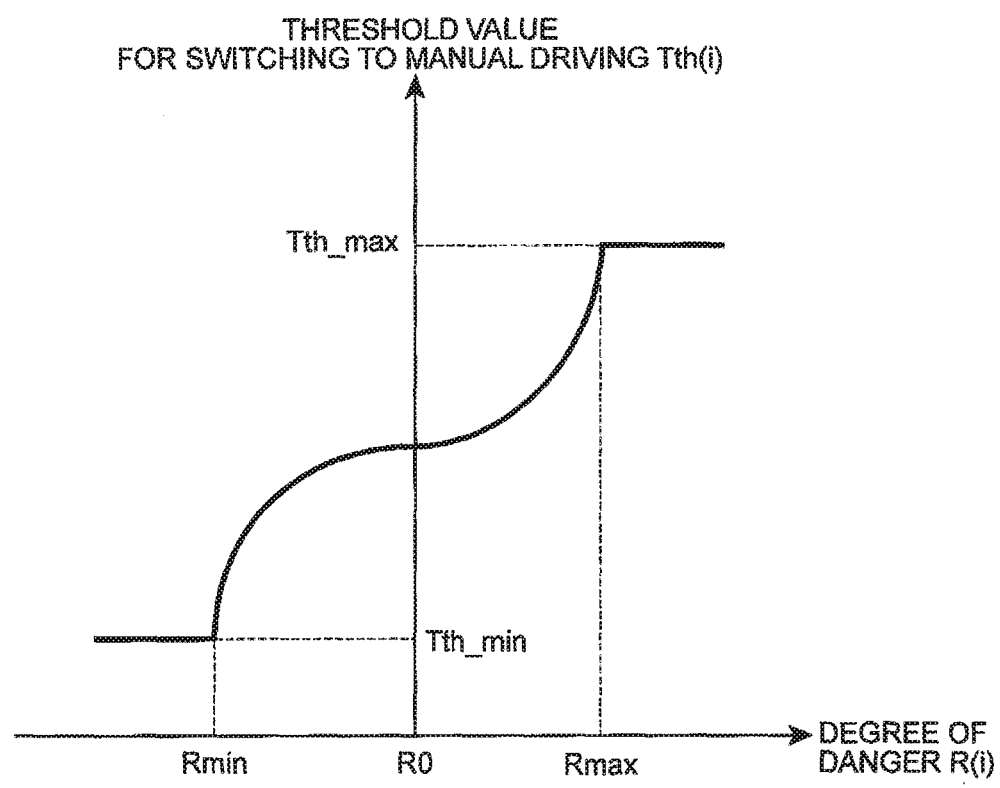
FIG. 8 is still another example of a graph illustrating the function of a threshold value for switching to manual driving to a degree of danger.

As illustrated in FIG. 7, the function describing the threshold value Tth(i) for switching to manual driving with respect to the degree of danger R(i) may be a function in which, in the range of Rmin≤degree of danger R(i)≤Rmax, the threshold value Tth(i) for switching to manual driving non-linearly increases as the degree of danger R(i) increases, and the rates of increase and decrease of the threshold value Tth(i) for switching to manual driving with respect to the rates of the increase and decrease of the degree of danger R(i) become higher as the degree of danger R(i) becomes closer to the degree of danger R0. In addition, as illustrated in FIG. 8, the function describing the threshold value Tth(i) for switching to manual driving with respect to the degree of danger R(i) may be a function in which, in the range of Rmin≤degree of danger R(i)≤Rmax, the threshold value Tth(i) for switching to manual driving non-linearly increases as the degree of danger R increases, and the rates of increase and decrease of the threshold value Tth(i) for switching to manual driving with respect to each of the increase and decrease of the degree of danger R(i) becomes higher as the degree of danger R(i) becomes farther from the degree of danger R0. In any case described above, similar to the example in FIG. 5, in the range of degree of danger R(i)>Rmax, the threshold value Tth(i) for switching to manual driving is Tth(i)=Tth_max. Furthermore, in the range of degree of danger R(i)<Rmin, it is possible to set the threshold value Tth(i) for switching to manual driving to be Tth(i)=Tth_min.

In the first embodiment, the degree of danger R(i) calculated by the calculation unit 14 becomes higher as the direction d(i) becomes closer to the obstacle, and thus, the threshold value Tth(i) for switching to manual driving increases as the degree of danger R(i) increases. In addition, when no obstacle is present in the vicinity of the host vehicle V, the calculation unit 14 calculates the threshold value Tth(i) for switching to manual driving as Tth(i)=Tth_min. Therefore, the threshold value Tth(i) for switching to manual driving calculated by the calculation unit 14 becomes greater when the direction d(i) of the steering operation for which the value indicative of the degree to which the steering operation is carried out is acquired is the direction close to the obstacle than that when the direction d(i) of the steering operation is a direction away from the obstacle or when no obstacle is recognized by the recognition unit.

Figure 9A:
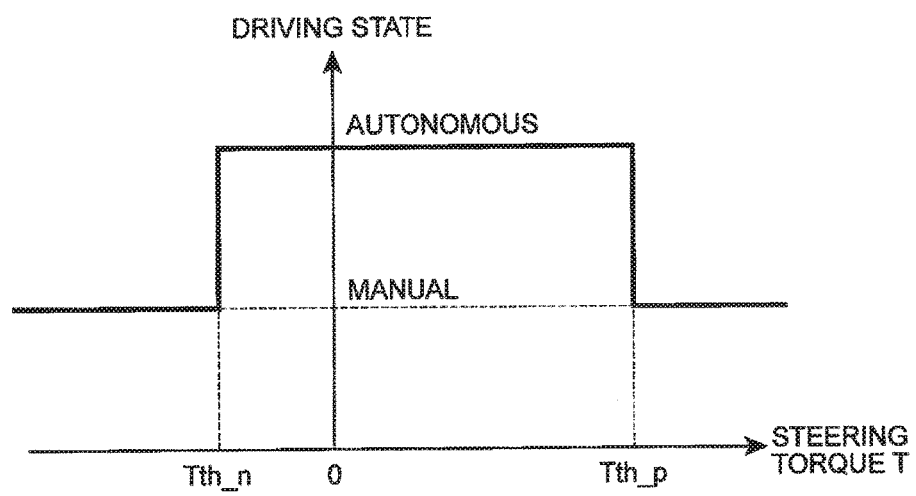
FIG. 9A is a graph in which the threshold value for switching to manual driving for switching the driving state from autonomous driving to manual driving with respect to a steering torque in the right direction is greater than that with respect to a steering torque in the left direction.
Figure 9B:
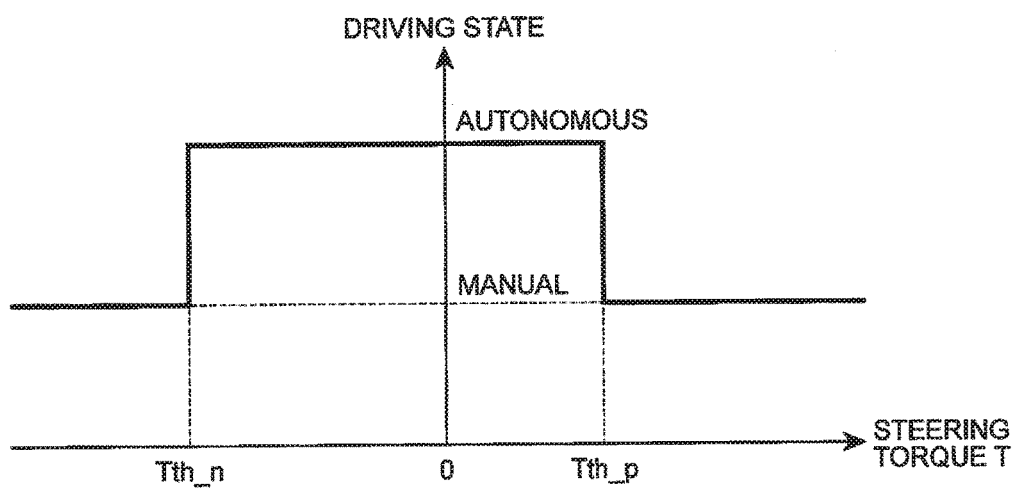
FIG. 9B is a graph in which the threshold value for switching to manual driving for switching the driving state from autonomous driving to manual driving with respect to a steering torque in the left direction is greater than that with respect to a steering torque in the right direction.

As described above, the threshold value Tth(i) for switching to manual driving is calculated, which corresponds to the degree of danger R(i) in each case where the host vehicle V is assumed to travel in various directions d(i) according to the steering operation by the driver. In FIGS. 9A and 9B, an example is illustrated in which the value indicative of the degree to which a steering operation is carried out by the driver of the host vehicle V is indicated as a steering torque T. In the following description with respect to FIG. 9A, for the sake of simplicity, specific values are given, for example, a threshold value Tth_p for switching to manual driving which corresponds to an average value of the degrees of danger R(i) in a range of typical directions d(i) such as the right direction of 15° to 45° is defined as the threshold value for switching to manual driving with respect to the steering torque T in the right direction, and a threshold value Tth_n for switching to manual driving which corresponds to an average value of the degrees of danger R(i) in a range of typical directions d(i) such as the left direction of 15° to 45° is defined as the threshold value for switching to manual driving with respect to the steering torque T in the left direction.

Alternatively, in relation to FIG. 9A and FIG. 9B, for example, the threshold value Tth_p for switching to manual driving which corresponds to the degree of danger R(i) in a typical direction d(i) such as the right direction of 30° may be defined as the threshold value for switching to manual driving with respect to the steering torque T in the right direction, and the threshold value Tth_n for switching to manual driving which corresponds to the degree of danger R(i) in a typical direction d(i) such as the left direction of 30° may be defined as the threshold value for switching to manual driving with respect to the steering torque T in the left direction.

In the example in FIG. 9A, during the autonomous driving, with respect to the steering operation in the right direction, it is difficult to switch the driving state to manual driving, and with respect to the steering operation in the left direction, it is easy to switch the driving state to manual driving. On the other hand, in the example in FIG. 9B, during the autonomous driving, with respect to the steering operation in the right direction, it is easy to switch the driving state to manual driving, and with respect to the steering operation in the left direction, it is difficult to switch the driving state to manual driving.

Figure 10:
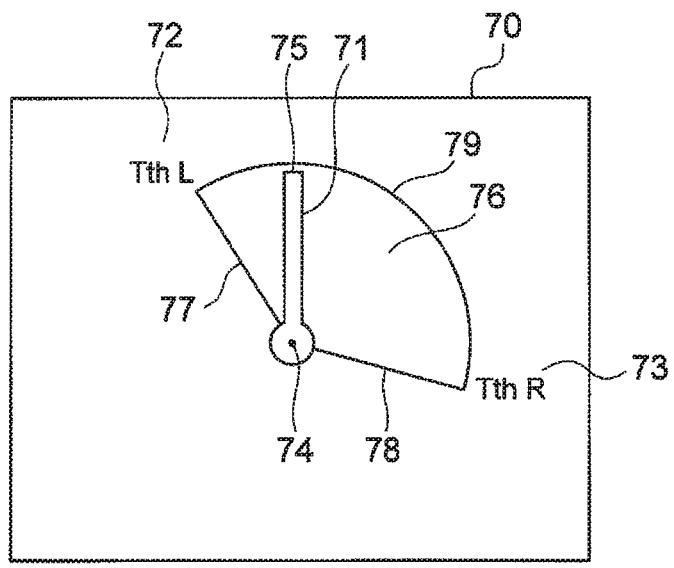
FIG. 10 is a diagram illustrating an example of the threshold value for switching to manual driving displayed on a display.

As illustrated in FIG. 2, the display unit 15 of the ECU 10 displays the threshold value Tth for switching to manual driving for each steering direction calculated by the calculation unit 14 on the HMI 7 (S5). As illustrated in FIG. 10, the HMI 7 includes an indicator 70 that indicates the threshold value for switching to manual driving for each direction of steering operation on an instrument panel or the like. In the example in FIG. 10, the threshold value for switching to manual calculated as in example in FIGS. 9A and 9B is illustrated. The indicator 70 includes a fan-shaped display frame 76. The fan-shaped display frame 76 includes radius lines 77 and 78 which are a pair of radius line segments of the fan shape, and a circumferential line 79 which is a circumference of the fan shape. In the display frame 76, the indicator 70 includes an indication pointer 71 which indicates the value indicative of the degree to which the steering operation is carried out by the driver of the host vehicle V, and displays 72 and 73 of threshold values for switching to manual driving which indicate threshold values Tth L and Tth R for switching to manual driving for each direction of the steering operation of left and right, respectively, in addition to the fan-shaped circumferential line 79 of the display frame 76.

The indication pointer 71 includes a fixed end 74 and an indicating end 75 at opposite ends of the indication pointer 71. The fixed end 74 is rotatably fixed at the center of the fan-shaped display frame 76. The indicating end 75 rotates along the circumferential line 79 of the display frame 76 with the fixed end 74 as the center. The indicating end 75 indicates the current value indicative of the degree to which the steering operation is carried out. When the current value indicative of the degree to which the steering operation is carried out is zero, the indicating end 75 points in the vertically upward direction. When the current value indicative of the degree to which the steering operation is carried out has a value greater than zero in any direction of right and left, the indicating end 75 points in a direction away from the vertically upward direction at an angle corresponding to the value indicative of the degree to which the steering operation is carried out.

The displays 72 and 73 of threshold value for switching to manual driving are displayed outside of the circumferential line 79 of the fan-shaped display frame 76. The displays 72 and 73 of threshold value for switching to manual driving are displayed at positions corresponding to the threshold value for switching to manual driving calculated by the calculation unit 14 outside of the circumferential line 79 of the fan-shaped display frame 76. The positions of the displays 72 and 73 of threshold value for switching to manual driving vary according to the variation of the threshold value for switching to manual driving. In the example in FIG. 10, the radius lines 77 and 78 of the display frame 76 are displayed at positions corresponding to the positions of the displays 72 and 73 of threshold value for switching to manual driving, and the length of the circumferential line 79 varies to a length corresponding to the positions of the line ends of the radius lines 77 and 78. Therefore, the shape of the fan-shaped display frame 76 also varies according to the variation of the displays 72 and 73 of threshold value for switching to manual driving. The radius lines 77 and 78 and the circumferential line 79 of the display frame 76 may be fixed such that the display frame 76 becomes a certain fan shape, and only the positions of the displays 72 and 73 of threshold value for switching to manual driving may vary as time elapses.

By the display on the indicator 70, it is easy for the driver to intuitively ascertain the ease of switching to manual driving with respect to each of right and left steering operations. When the threshold value for switching to manual driving calculated by the calculation unit 14 is small, difference between the same value indicative of the degree to which the steering operation is carried out and the threshold value for switching to manual driving from the position where the indication pointer 71 and the displays 72 and 73 of threshold value for switching to manual driving indicate the value of zero may be larger. That is, the indicator 70 may be re-scaled as necessary. In this way, even when the threshold value for switching to manual driving is small, it is possible to make the display on the indicator 70 be easily seen.

The indicator 70 may indicate not only the threshold value Tth_p for switching to manual driving with respect to the steering torque T in the right direction and the threshold value Tth_n for switching to manual driving with respect to the steering torque T in the left direction which are calculated by the calculation unit 14, but also the threshold value Tth(i) for switching to manual driving corresponding to the direction d(i) when the threshold value Tth(i) for switching to manual driving corresponding to the degree of danger R(i) in each case where the host vehicle V is assumed to travel in various directions d(i) (for example, in right and left directions of 0° to 90° respectively and in right and left directions of 0° to 180° respectively). Alternatively, the indicator 70 may display a maximum value or a minimum value of the threshold value Tth_p for switching to manual driving when the host vehicle V is assumed to travel in the right direction of 0° to 90° or in the right direction of 0° to 180°, or may display a maximum value or a minimum value of the threshold value Tth_n for switching to manual driving when the host vehicle V is assumed to travel in the left direction of 0° to 90° or toward the left direction of 0° to 180°.

In addition, the indicator 70 is not limited to the example described above, and the indicator 70 may include a rectangular display frame which has a pair of long sides parallel to the horizontal direction and a pair of short sides parallel to the vertical direction. An indication pointer that indicates the current value indicative of the degree to which a steering operation is carried out by the driver of the host vehicle V may be included in the rectangular display frame, and a display of threshold values for switching to manual driving that indicate the threshold value for switching to manual driving of each of the right and left steering direction may be included in the vicinity of the pair of short sides of the rectangular display frame.

In this case, the indication pointer indicates the current value indicative of the degree to which a steering operation is carried out by moving between the right and left short sides of the rectangular display frame. When the current value indicative of the degree to which a steering operation is carried out is zero, the indication pointer is positioned at the center of the indicator 70. The right and left displays of threshold value for switching to manual driving are displayed at the position corresponding to the threshold value for switching to manual driving calculated by the calculation unit 14 at the outside of the short sides of the rectangular display frame. The position of the right and left displays of threshold values for switching to manual driving varies according to the variation of the threshold values for switching to manual driving. In accordance with the variation of the position of the right and left displays of threshold values for switching to manual driving, the positions of the short sides of the rectangular display frame vary. Lengths of the pair of long sides of the rectangular display frame vary according to the variation of the positions of the short sides. The rectangular display frame may be fixed so as to have a constant rectangular shape, and only the position of the right and left displays of threshold values for switching to manual driving may vary according to the variation of the threshold values for switching to manual driving.

Figure 11A:
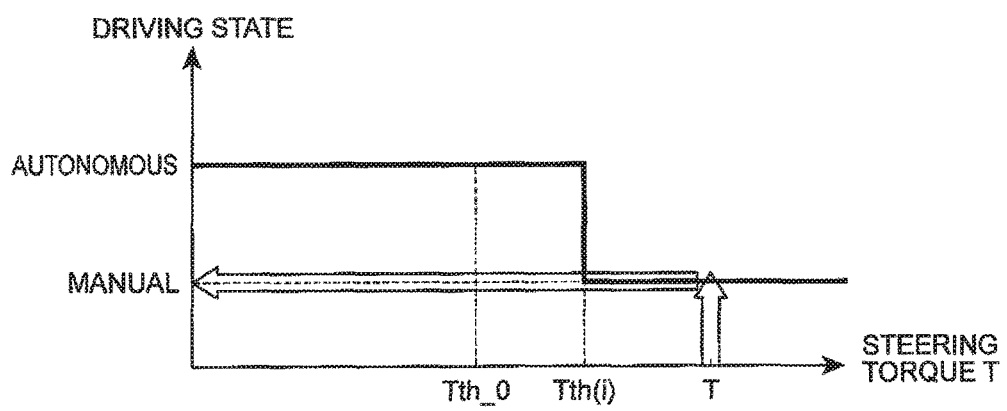
FIG. 11A is a graph illustrating a driving state when the steering torque is greater than the threshold value for switching to manual driving.
Figure 11B:
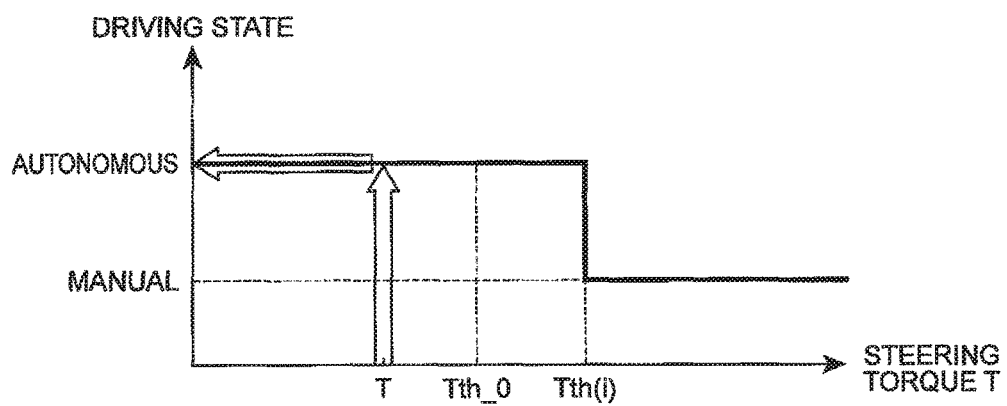
FIG. 11B is a graph illustrating a driving state when the steering torque is smaller than the threshold value for switching to manual driving.

As illustrated in FIG. 2, the acquisition unit 11 of the ECU 10 acquires the value indicative of the degree to which a steering operation is carried out by the driver of the host vehicle V during the autonomous driving in parallel with the processing tasks S2 to S5 described above (S6). Alternatively, the acquisition unit 11 may acquire the value indicative of the degree to which the steering operation is carried out after the processing tasks S2 to S5 described above. When the value indicative of the degree to which the steering operation is carried out (steering torque T) is equal to or greater than the threshold value Tth for switching to manual driving as illustrated in FIG. 2 and FIG. 11A, (S7), the control unit 16 switches the driving state from autonomous driving to the manual driving (S8). On the other hand, when the value indicative of the degree to which the steering operation is carried out (steering torque T) is less than the threshold value Tth for switching to manual driving as illustrated in FIG. 2 and FIG. 11B, (S7), the control unit 16 continues autonomous driving.

According to the first embodiment, the threshold value Tth for switching to manual driving which is used for switching the driving state from autonomous driving to manual driving with respect to the value indicative of the degree to which a steering operation is carried out by the driver is calculated to be a greater value by the calculation unit 14 when the direction of the steering operation is the direction close to the obstacle than that when the direction of the steering operation is any one of the directions away from the obstacle or the direction in which the obstacle does not exist. For this reason, for example, when the direction of the steering operation is the direction away from the obstacle because the driver recognizes the obstacle or when the obstacle is not present, it becomes easy to switch the driving state from autonomous driving to manual driving. Therefore, the operability of switching the driving state from autonomous driving to manual driving is improved. On the other hand, for example, when the driver does not recognize the obstacle and the direction of the steering operation is the direction close to the obstacle, it becomes difficult to switch the driving state from autonomous driving to manual driving. Therefore, it is possible to reduce switching of the driving state from autonomous driving to manual driving due to an erroneous operation.

For example, in a situation in which there is no three-dimensional structure such as a curb or a gutter at the end of the road on which the host vehicle V travels, since it is easy to switch the driving state from autonomous driving to manual driving with respect to the steering operation of the host vehicle V to approach the end of the road, the operability is improved. On the other hand, for example, in a situation in which there are obstacles around the host vehicle V which are not easily recognized by the driver such as a gutter or a low guardrail, it is difficult to switch the driving state from autonomous driving to manual driving. Therefore, it is possible to prevent such an erroneous operation in which the host vehicle V approaches the obstacle which is not recognized by the driver.

In addition, in the first embodiment, the threshold value Tth for switching to manual driving for each direction of the steering operation is displayed by the display unit 15. Therefore, it becomes easy for the driver to recognize the situation when the driving state is switched from autonomous driving to manual driving.

As set forth above, some exemplary embodiments of the present disclosure are described. However, the present invention is not limited to the embodiment described above and can be embodied in various forms. For example, in the first embodiment described above, the threshold value Tth for switching to manual driving for each direction of the steering operation is displayed by the display unit 15. However, in an alternative embodiment, the display unit 15 is not necessarily required. In addition, when the direction of the steering operation is the direction close to the obstacle, the driver of the host vehicle V may be notified of a warning by a voice using the speaker of the display unit 15 and the HMI 7. Additionally, the driver of the host vehicle V may be notified of approaching or reaching the threshold value Tth for switching to manual driving for each direction of the steering operation by a voice using the speaker of the display unit 15 and the HMI 7.

What is claimed is:

1. An autonomous driving device configured to execute autonomous driving of a host vehicle, and switch a driving state from autonomous driving to manual driving when a value indicative of a degree to which a steering operation is carried out by a driver of the host vehicle during the autonomous driving is equal to or greater than a threshold value for switching to manual driving, the device comprising:
   an acquirer configured to acquire the value indicative of a degree to which the steering operation is carried out during the autonomous driving;

a recognizer configured to recognize at least one obstacle around the host vehicle;

a calculator configured to calculate the threshold value for switching to manual driving and to calculate a degree of danger based on a future state value of the host vehicle and a future state value of the at least one obstacle; and a controller configured to execute the autonomous driving and switch the driving state from autonomous driving to manual driving when the value indicative of a degree to which the steering operation is carried out by the driver is equal to or greater than the threshold value for switching to manual driving, wherein the calculator is configured to calculate a threshold value for switching to manual driving as being a minimum threshold value in response to the degree of danger is less than a minimum degree of danger, a maximum threshold value in response to the degree of danger is greater than a maximum degree of danger, and a value between the minimum threshold value and the maximum threshold value and linearly dependent of the degree of danger in response to the degree of danger is greater than or equal to the minimum degree of danger and less than or equal to the maximum degree of danger.

2. The autonomous driving device according to claim 1, further comprising:

a display configured to display the threshold value for switching to manual driving for a plurality of directions of the steering operation and the threshold value for when no obstacle is recognized by the recognition unit.

3. The autonomous driving device according to claim 2, wherein the indicator comprises a fan-shaped display frame, a first radius line and a second radius line which are a pair of radius line segments of the fan shape, an indication pointer which indicates the amount of steering operation by the driver of the host vehicle, a first threshold value display and a second threshold value display, wherein the first radius line and the first threshold value display correspond to the direction of the steering operation predicted to be the direction close to the at least one obstacle, and wherein the second radius line and the second threshold value display correspond to the direction of the steering operation predicted to be any one of the direction away from the at least one obstacle and the direction in which the at least one obstacle does not exist.

4. The autonomous driving device according to claim 1, wherein the acquirer is configured to acquire a steering angle of a steering wheel as the value indicative of a degree to which the steering operation is carried out.

5. The autonomous driving device according to claim 1, wherein the degree of danger is calculated using the direction of the steering operation, and the acquirer is configured to acquire a steering torque with respect to a steering wheel as the value indicative of a degree to which the steering operation is carried out.

6. The autonomous driving device according to claim 1, wherein the calculator is configured to calculate a current state value of the vehicle based on one of position, heading, speed, and acceleration of the host vehicle based on information acquired by any of an external sensor, GPS receiver, and internal sensor, and the calculator is configured to predict the future state value of the host vehicle after a predetermined time has passed.

7. The autonomous driving device according to claim 6, wherein the calculator is configured to acquire a current state value of the obstacle based on one of position, distance, direction, speed, and acceleration of the obstacle based on information recognized by the recognizer, and the calculator is configured to predict the future state value of the obstacle after the predetermined time has passed.

8. The autonomous driving device according to claim 7, wherein the calculator is configured to input the future state value of the host vehicle and the future state value of the obstacle into a function set in advance to calculate the future state value of the host vehicle and the future state value of the obstacle.

9. The autonomous driving device according to claim 8, wherein the calculator is configured to calculate the threshold value for switching to manual driving based on the degree of danger in various directions according to the steering operation by the driver.

10. The autonomous driving device according to claim 9, wherein the threshold value for switching to manual driving linearly increases as the degree of danger increases.

11. The autonomous driving device according to claim 9, wherein the threshold value for switching to manual driving non-linearly increases as the degree of danger increases.

12. An autonomous driving device configured to execute autonomous driving of a host vehicle, and switch a driving state from autonomous driving to manual driving when an value indicative of a degree to which the steering operation is carried out by a driver of the host vehicle during the autonomous driving is equal to or greater than a threshold value for switching to manual driving, the device comprising:

a means for acquiring the value indicative of a degree to which the steering operation is carried out during the autonomous driving;

a means for recognizing an obstacle around the host vehicle;

a means for calculating the threshold value for switching to manual driving and for calculating a degree of danger based on a future state value of the host vehicle and a future state value of the at least one obstacle; and a means for executing the autonomous driving and switch the driving state from autonomous driving to manual driving when the value indicative of a degree to which the steering operation is carried out by the driver is equal to or greater than the threshold value for switching to manual driving, wherein the means for calculating is configured to calculate a threshold value for switching to manual driving as being a minimum threshold value in response to the degree of danger is less than a minimum degree of danger, a maximum threshold value in response to the degree of danger is greater than a maximum degree of danger, and a value between the minimum threshold value and the maximum threshold value and linearly dependent of the degree of danger in response to the degree of danger is greater than or equal to the minimum degree of danger and less than or equal to the maximum degree of danger.

13. The autonomous driving device according to claim 12, wherein the calculating means is configured to:
calculate a current state value of the vehicle based on one of position, heading, speed, and acceleration of the host vehicle based on information acquired by any of an external sensor, GPS receiver, and internal sensor,
calculate the future state value of the host vehicle after a predetermined time has passed,
acquire a current state value of the obstacle based on one of position, distance, direction, speed, and acceleration of the obstacle based on information recognized by the recognizer, and
calculate the future state value of the obstacle after the predetermined time has passed.

14. The autonomous driving device according to claim 13, wherein
the calculating means is configured to input the future state value of the host vehicle and the future state value of the obstacle into a function set in advance, and calculate a degree of danger based on the future state value of the host vehicle and the future state value of the obstacle.

15. The autonomous driving device according to claim 14, wherein
the calculating means is configured to calculate the threshold value for switching to manual driving based on the degree of danger in various directions according to the steering operation by the driver.

16. An autonomous driving device configured to execute autonomous driving of a host vehicle, and switch a driving state from autonomous driving to manual driving when a value indicative of a degree to which a steering operation is carried out by a driver of the host vehicle during the autonomous driving is equal to or greater than a threshold value for switching to manual driving, the device comprising:
an acquirer configured to acquire the value indicative of a degree to which the steering operation is carried out during the autonomous driving;
a recognizer configured to recognize an obstacle around the host vehicle;
a calculator configured to calculate the threshold value for switching to manual driving;
a controller configured to execute the autonomous driving and switch the driving state from autonomous driving to manual driving when the value indicative of a degree to which the steering operation is carried out by the driver is equal to or greater than the threshold value for switching to manual driving;
a display configured to display the threshold value for switching to manual driving for a plurality of directions of the steering operation and the threshold value for when no obstacle is recognized by the recognition unit,
wherein the calculator is configured to calculate a threshold value for switching to manual driving as being greater when a direction of the steering operation is predicted to be a direction close to an obstacle recognized by the recognition unit than a threshold value when the direction of the steering operation is predicted to be a direction away from an obstacle recognized by the recognition unit or a threshold value when no obstacle is recognized by the recognition unit,
the indicator comprises a fan-shaped display frame, a first radius line and a second radius line which are a pair of radius line segments of the fan shape, an indication pointer which indicates the amount of steering operation by the driver of the host vehicle, a first threshold value display and a second threshold value display,
wherein the first radius line and the first threshold value display correspond to the direction of the steering operation predicted to be the direction close to the obstacle, and
wherein the second radius line and the second threshold value display correspond to the direction of the steering operation predicted to be any one of the direction away from the obstacle and the direction in which the obstacle does not exist.

* * * * *